(12) United States Patent
Smith (10) Patent No.: US 7,370,749 B2
(45) Date of Patent: May 13, 2008

(54) CONVEYOR BELT CLEANING APPARATUS AND SYSTEM

(75) Inventor: Chris Smith, Overland Park, KS (US)

(73) Assignee: Safari Belting Systems, Inc., Overland Park, KS (US)

( * ) Notice: Subject to any disclaimer, the term of this patent is extended or adjusted under 35 U.S.C. 154(b) by 0 days.

(21) Appl. No.: 11/545,245

(22) Filed: Oct. 10, 2006

(65) Prior Publication Data

US 2007/0084699 A1    Apr. 19, 2007

Related U.S. Application Data

(60) Provisional application No. 60/727,149, filed on Oct. 14, 2005.

(51) Int. Cl.
*B65G 45/22* (2006.01)
(52) U.S. Cl. .................................................. 198/495
(58) Field of Classification Search ............... 198/495; 134/15, 122 R, 198
See application file for complete search history.

(56) References Cited

U.S. PATENT DOCUMENTS

| | | | |
|---|---|---|---|
| 2,681,728 A | 6/1954 | Boron | |
| 2,852,129 A | 9/1958 | Conner | |
| 3,016,235 A | 1/1962 | Cnudde | |
| 3,592,329 A * | 7/1971 | Fleischauer | ............... 209/563 |
| 3,602,364 A | 8/1971 | Maglio et al. | |
| 4,072,062 A | 2/1978 | Morling et al. | |
| 4,080,842 A | 3/1978 | Lapeyre et al. | |
| 4,213,527 A | 7/1980 | Lapeyre et al. | |
| 4,283,184 A | 8/1981 | Berg | |
| 4,556,142 A | 12/1985 | Lapeyre | |
| 4,678,244 A | 7/1987 | Furuta et al. | |
| 4,688,670 A | 8/1987 | Lapeyre | |
| 4,729,469 A | 3/1988 | Lapeyre et al. | |
| 4,925,016 A | 5/1990 | Lapeyre | |
| 6,425,479 B1 | 7/2002 | Guldenfels et al. | |
| 6,740,172 B1 | 5/2004 | Griffiths et al. | |
| 6,978,880 B2 * | 12/2005 | Barrett | ............... 198/495 |
| RE39,186 E * | 7/2006 | Montgomery | ............... 198/495 |

* cited by examiner

*Primary Examiner*—Mark A. Deuble
(74) *Attorney, Agent, or Firm*—John G. Fischer; Storm LLP (57) ABSTRACT

Health considerations mandate continuous and thorough cleaning of modular conveyor belts used in the food processing industry. A modular belt cleaning system is provided having a sleeve bearing slidable over a supply pipe, and having apertures for engaging nozzles in the supply pipe. A sprocket is mountable over the sleeve bearing. Depressible retainers are disclosed to permit installation and removal of a sprocket over the sleeve bearing.

19 Claims, 6 Drawing Sheets

CONVEYOR BELT CLEANING APPARATUS AND SYSTEM

CROSS-REFERENCE TO RELATED ART

This application claims priority to U.S. Provisional Application Ser. No. 60/727,149 filed Oct. 14, 2005.

TECHNICAL FIELD OF THE INVENTION

The invention relates generally to a conveyor system cleaning apparatus and, more particularly, to a cleaning system for a meat transporting conveyor system.

BACKGROUND OF THE INVENTION

In the meat and meat packing industries, conveyor belts and conveyor systems are commonly utilized to transport meat in processing plants.

The most frequently employed conveyor systems comprise a number of interlocking conveyor modules linked together to form a continuous conveyor belt, which is driven by a sprocket. Some examples of these types of conveyor systems are U.S. Pat. Nos. 4,925,016, 6,425,479, 3,602,364, 4,072,062, 4,080,842, 4,213,527, and 4,556,142. Some systems both drive the belt and track the belt with the sprockets.

In the meat and meat packing industries, cleanliness is paramount to the entire operation. Meat and meat byproducts, by their very nature, carry bacteria. These bacteria can be harmful to humans and/or animals that eventually consume the meat or meat products. It is very difficult to eliminate all of the bacteria during processing, so measures are taken to control bacterial populations within the meat and meat products.

One method of controlling bacterial growth is frequent cleaning of the machines and apparatuses in contact with meat. By frequently cleaning the machines and apparatuses, the size and development of bacterial colonies can be reduced and managed.

In meat processing operations, the conveyor belts are constantly in contact with meat and meat byproducts. Because of the regularity of use, it is essential to frequently clean the conveyor belts. Conventional conveyor belt systems in the meat industry are not uniform elastic belts with continuous contact surface. Instead, the belts are commonly formed of interlocking modules that are propelled and tracked by sprockets.

Figure 1:
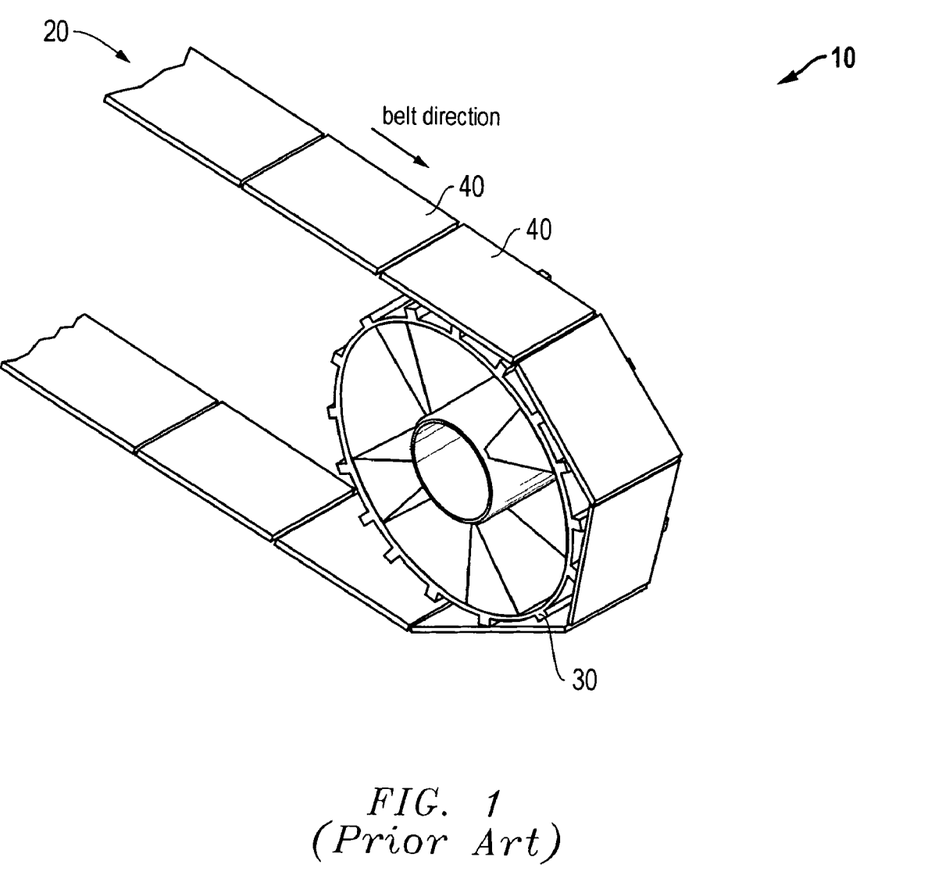
FIG. 1 is an isometric view of a conventional conveyor belt system.

Referring to FIG. 1 of the drawings, the reference numeral 10 generally designates a conventional conveyor system. Conveyor system 10 comprises a conveyor belt 20 and a sprocket 30. Conveyor belt 20 is comprised of a plurality of interlocking modules 40. Because conveyor belt 20 lacks a continuous surface, it is very easy for meat and meat byproducts to become wedged between interlocked modules 40 and decay. In addition, meat and meat byproducts can become wedged between sprocket 30 and the undersides of conveyor modules 40. Absent continuous cleaning efforts, hazardous biological colonies would grow unabated and present an unacceptable health risk.

To effectively provide continuous cleaning, an automated cleaning system must be incorporated into conveyor system 10. Specifically, an apparatus is required that can spray a cleaning/disinfecting solution on belt 20 to wash away or kill bacteria caused by meat particles lodged between modules 40 and between modules 40 and sprocket 30 of conveyor system 10.

To clean conveyor system 10, it is known to place a cleaning system underneath belt 20 and utilize spray nozzles to clean the system. Examples of such cleaning systems are U.S. Pat. Nos. 6,740,172 and 3,016,235. There are a number of positions underneath belt 20 whereby a cleaning system can be positioned. However, it is more likely to have the greatest effect where the interlocking modules 40 pivot apart from each other. Pivoting of the interlocking modules 40 occurs at the locations where belt 20 is propelled by and/or tracked by sprocket 30.

One problem associated with positioning a cleaning system beneath or at the center of a rotating sprocket is that the sprocket will wear against the cleaning system and they are not easily repaired. Another problem is that frictional rotation of Polyvinyl Chloride (PVC) materials against stainless steel results in a leaching action that stains the surface of the stainless steel and causes the build-up of a black tarry substance. Therefore, there is a need for a method and/or apparatus for cleaning a conveyor system that is wear resistant, resists leaching and is easily repaired.

SUMMARY OF THE INVENTION

In accordance with a preferred embodiment of the present invention, a conveyor belt cleaning system is provided. Within the cleaning system is a supply pipe for carrying a cleaning and/or disinfecting solution, such as water or a solvent. A plurality of removable spray nozzles are secured to the supply pipe. A removable sleeve bearing is located on the supply pipe. One or more apertures are located on the sleeve bearing for engaging a spray nozzle to prevent rotation of the sleeve bearing. A sprocket is rotatably mounted on the sleeve bearing.

In another preferred embodiment, the sleeve bearing is located between two spray nozzles. In another preferred embodiment, the supply pipe is comprised of stainless steel. In another preferred embodiment, the sleeve bearing is comprised of plastic. In a still more preferred embodiment, the sleeve bearing is comprised of Polyvinyl Chloride (PVC).

In another preferred embodiment, the apertures in the sleeve bearing are substantially semi-circular and located on the ends of the sleeve bearing. In another preferred embodiment, the removable spray nozzles are comprised of stainless steel. In another preferred embodiment, each removable spray nozzle has a substantially linear spray pattern. In a more preferred embodiment, a flow straightener is attached to each nozzle.

In another preferred embodiment, retainers are provided on the sleeve bearing, having sloped risers and a relief partially inscribing the perimeter of the retainer. In this embodiment, depression of the retainer permits installation and removal of the sprocket, and the retainer then limits lateral movement of the installed sprocket.

Figure 10:
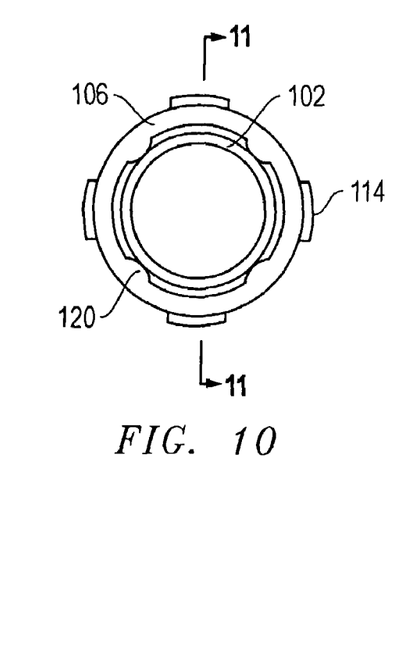
FIG. 10 is an end view of another preferred embodiment of the cleaning system, having retainers and centering ribs located on the supply pipe.
Figure 11:
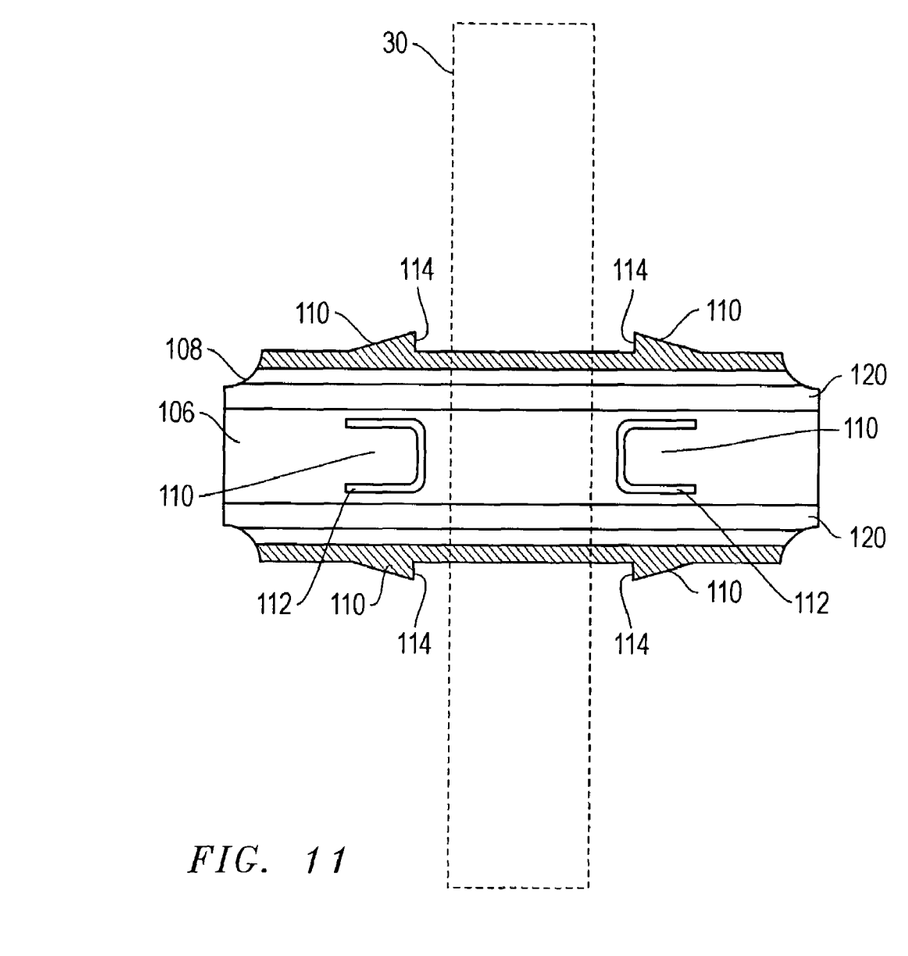
FIG. 11 is a cross-sectional view of the sleeve bearing embodiment illustrated in FIG. 10.

In FIGS. 10 and 11, another preferred embodiment is illustrated in which system 100 includes centering ribs. In this embodiment, the ribs center the sleeve bearing on the supply pipe. In another preferred embodiment, the ribs can be located so as to optionally prevent or allow depression of the retainer when installed on the supply pipe.

The foregoing has outlined rather broadly the features and technical advantages of the present invention in order that the detailed description of the invention that follows may be better understood. Additional features and advantages of the invention will be described hereinafter which form the subject of the claims of the invention.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
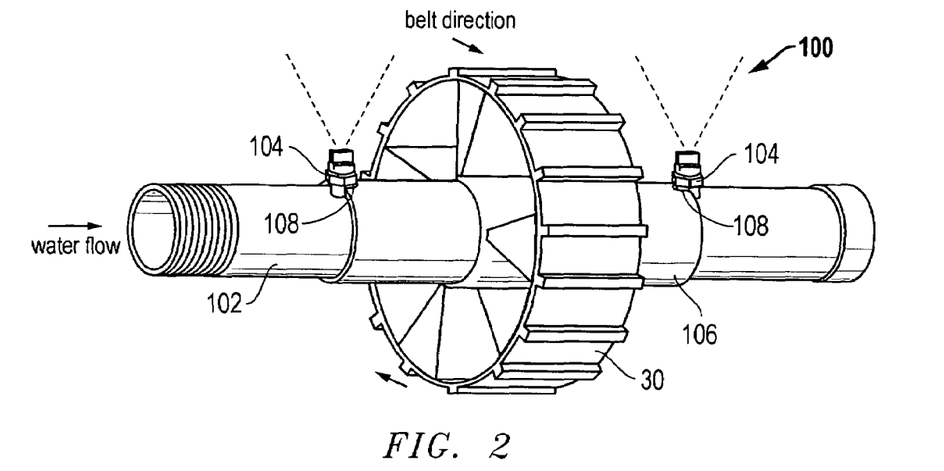
FIG. 2 is an isometric side view of the cleaning system in accordance with a preferred embodiment of the present invention.
Figure 3:
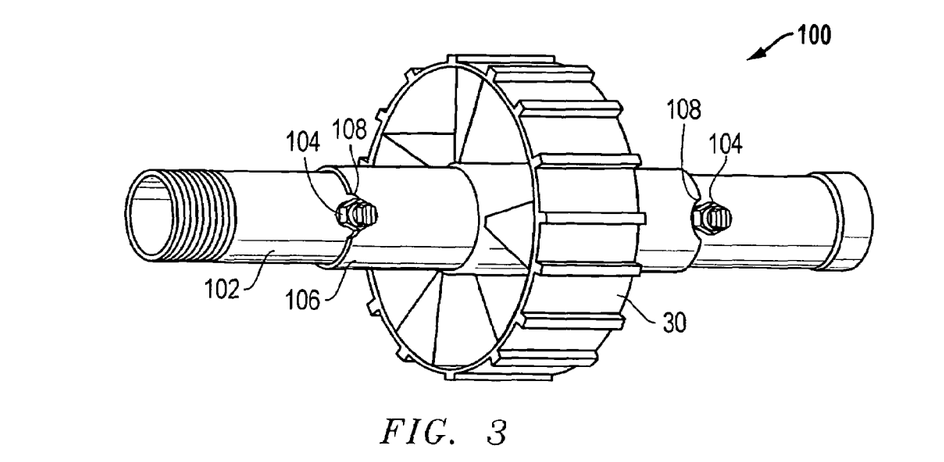
FIG. 3 is an isometric top view of the cleaning system of FIG. 2.
Figure 4:
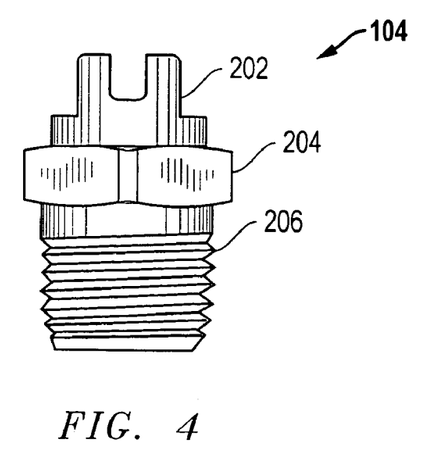
FIG. 4 is a front view of the nozzle in accordance with a preferred embodiment of the present invention.
Figure 5:
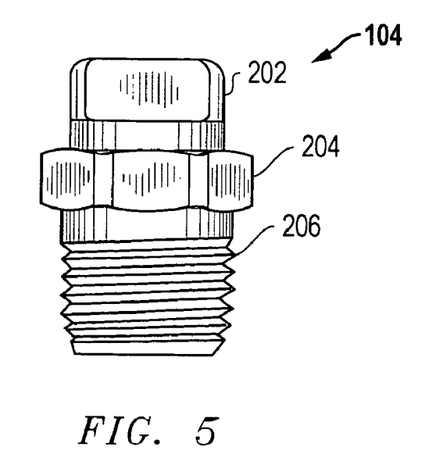
FIG. 5 is a side view of the nozzle of FIG. 4.
Figure 6:
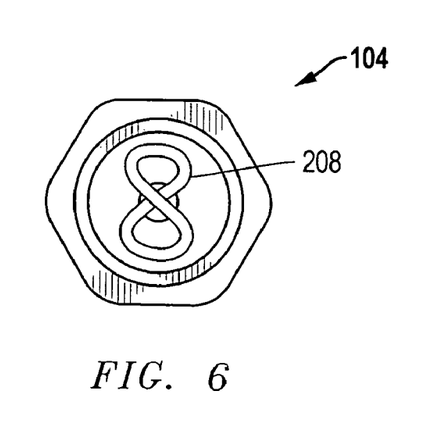
FIG. 6 is a bottom view of the nozzle of FIG. 4.
Figure 7:
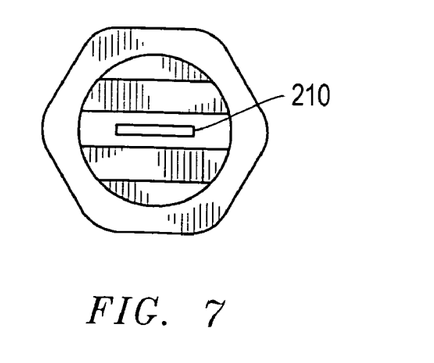
FIG. 7 is a top view of the nozzle of FIG. 4.

Referring to FIGS. 2 and 3 of the drawings, the reference numeral 100 generally designates the cleaning system. Cleaning system 100 has a supply pipe 102. Nozzles 104 are removably connected to supply pipe 102. In the preferred embodiment, nozzles 104 are connected to supply pipe 102 by threaded pipe connection. A removable sleeve bearing 106 is slidably located over supply pipe 102. An aperture 108 is located on sleeve bearing 106. In another preferred embodiment, aperture 108 is located on an end of sleeve bearing 106. In this embodiment, as illustrated, aperture 108 is preferably semicircular.

In a preferred embodiment, each end of sleeve bearing 106 has an aperture 108. Apertures 108 engage nozzles 104 to prevent rotation of sleeve bearing 106 relative to supply pipe 102. In the preferred embodiment, a sprocket 30 is rotatably mounted on sleeve bearing 106. As illustrated in FIG. 3, sprocket 30 is located between nozzles 104. In this preferred embodiment, engagement of apertures 108 with nozzles 104 prevents rotation of sleeve bearing 106.

In the preferred embodiment, supply pipe 102 is comprised of stainless steel. Also in the preferred embodiment, sleeve bearing 106 is comprised of plastic, and preferably Polyvinyl Chloride (PVC).

In FIGS. 4-7, nozzles 104 are shown in greater detail. In the preferred embodiment, nozzle 104 has a spray head 202. A tool grip 204 is located beneath spray head 202. A threaded section 206 is located beneath tool grip 204. Threaded section 206 is adapted to thread connect with a threaded aperture in supply pipe 102. Spray head 202, tool grip 204 and threaded section 206 are substantially hollow to provide a fluid channel for receiving fluid carried by supply pipe 102. Fluid flowing through supply pipe 102 exits an exit port 210 in spray head 202.

In a more preferred embodiment, a flow straightener 208 is located within the interior of nozzle 104. In the preferred embodiment, spray nozzle 104 is comprised of stainless steel. Spray nozzles 104 of the type illustrated are commercially available, such as model MEG ¼ NPT from Spraying Systems Co., P.O. Box 7900, Wheaton, Ill. 60189-7900 USA.

In FIGS. 8-13, a more preferred embodiment is illustrated in which system 100 includes retainers 110 located on sleeve bearing 106. In this embodiment, engagement of sprocket 30 with retainers 110 limits lateral movement of sprocket 30 on sleeve bearing 106. In the preferred embodiment, retainers 110 are sloped, and have a substantially vertical riser 114 at its end. Risers 114 extend beyond the exterior surface of sleeve bearing 106. Interference with risers 114 limits lateral movement of sprocket 30 to a predetermined and acceptable amount.

Figure 8:
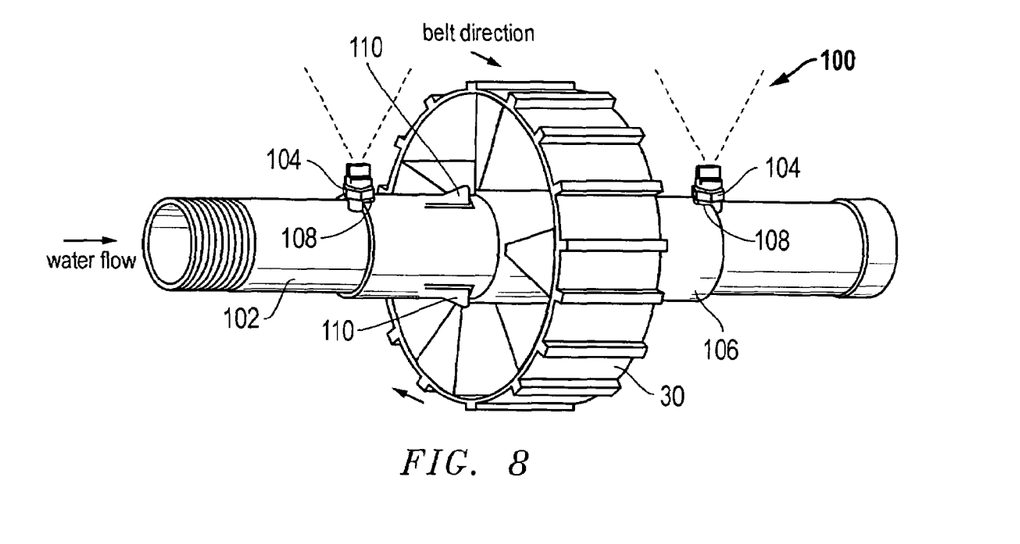
FIG. 8 is an isometric side view of another preferred embodiment of the cleaning system, having a retainer located on the sleeve bearing.
Figure 9:
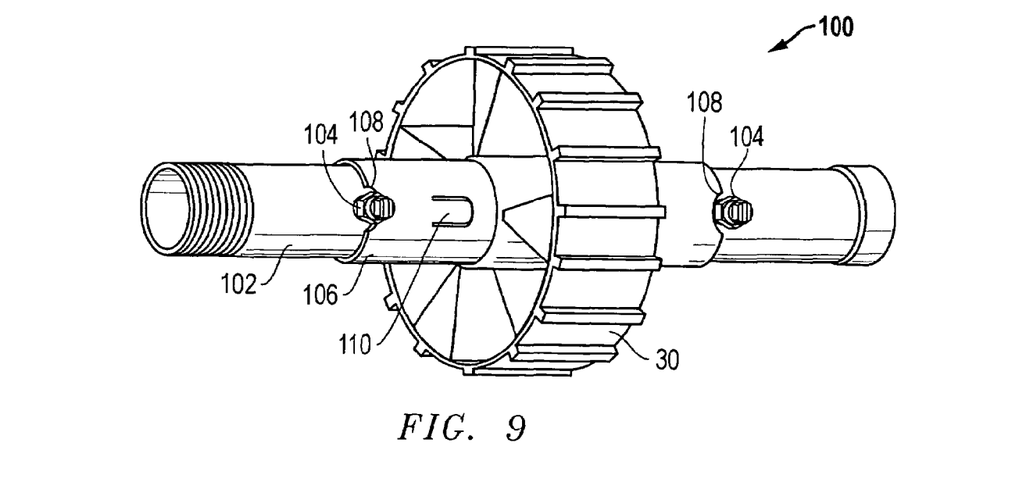
FIG. 9 is an isometric top view of the cleaning system of FIG. 8.
Figure 13:
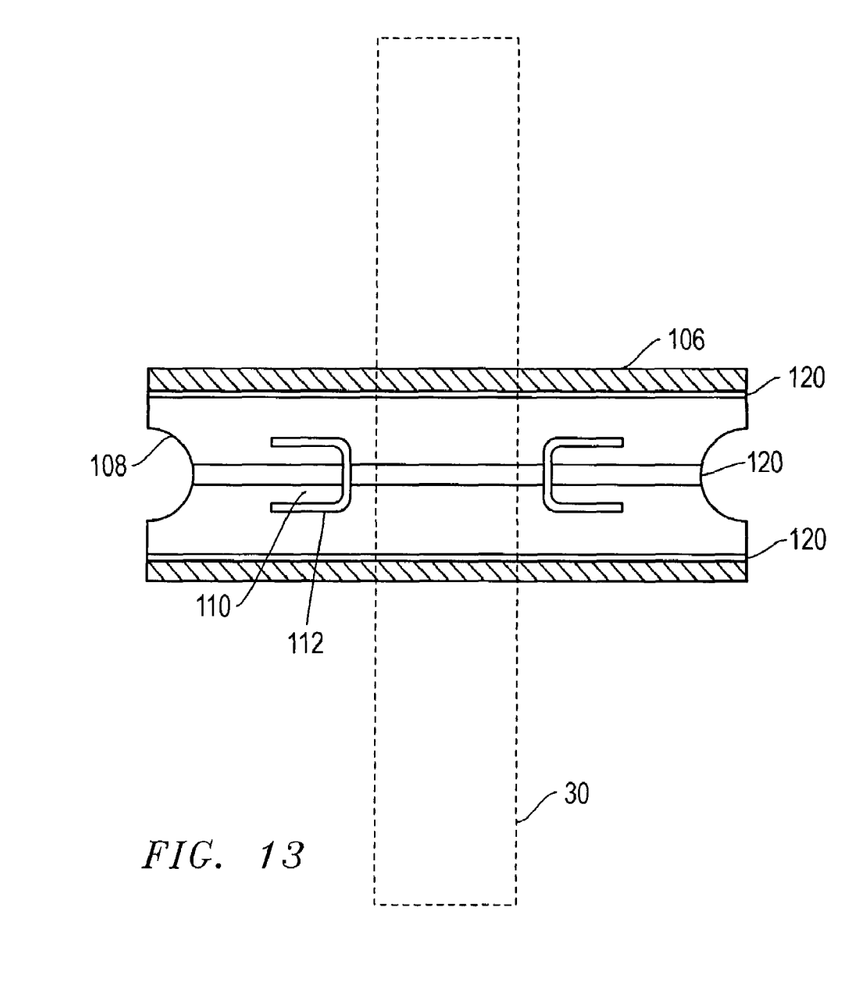
FIG. 13 is a cross-sectional view of the sleeve bearing embodiment illustrated in FIG. 12.

In the preferred embodiments illustrated in FIGS. 11 and 13, opposing retainers 110 are provided on opposite sides of sprocket 30. In an optional embodiment, multiple retainers 110 are located at a lateral position on sleeve bearing 106, for engagement with one side of sprocket 30. In this embodiment, retainers 110 are preferably located in angularly spaced relationship, such as seen in FIGS. 8, 10, and 11.

Also in the preferred embodiment, reliefs 112 in sleeve bearing 106 partially inscribe the perimeter of retainers 110. In this embodiment, depression of retainers 110 through reliefs 112 lowers risers 114 substantially even with the exterior surface of sleeve bearing 106 to permit installation and removal of sprocket 30 on sleeve bearing 106.

In FIGS. 10 and 11, another preferred embodiment is illustrated in which system 100 includes centering ribs 120 located on the interior surface of sleeve bearing 106. In the embodiment illustrated in FIGS. 10 and 11, a plurality of centering ribs 120 are positioned laterally and axially so as not to interfere with the operation of retainers 110. In this embodiment, three or four centering ribs are preferred, although more or less can be used.

Figure 12:
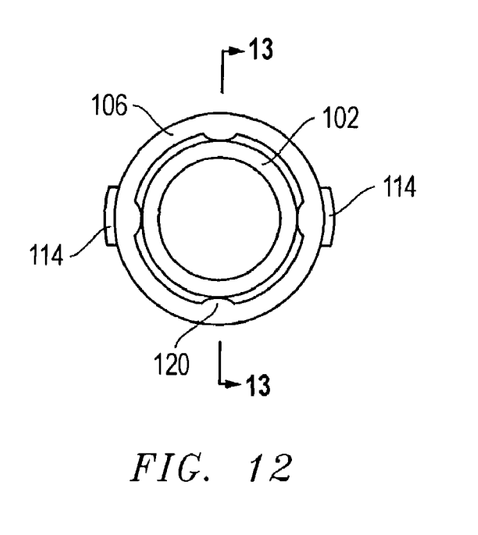
FIG. 12 is an end view of another preferred embodiment of the cleaning system, having retainers and centering ribs located on the supply pipe, with the centering ribs located aligned with the retainers.

In FIGS. 12 and 13, another preferred embodiment is illustrated in which system 100 includes centering ribs 120 located on the interior surface of sleeve bearing 106. In the embodiment illustrated in FIGS. 12 and 13, a plurality of centering ribs 120 are positioned laterally and axially so as to interfere with the operation of retainers 110 when sleeve bearing 106 is installed on supply pipe 102. Also in this embodiment, three or four centering ribs are preferred, although more or less can be used.

Operation of the Preferred Embodiments

Referring to FIGS. 2 and 3 of the drawings, the reference numeral 100 generally designates the cleaning system. Cleaning system 100 has a supply pipe 102. Nozzles 104 are removably connected to supply pipe 102. In the preferred embodiment, nozzles 104 are connected to supply pipe 102 by threaded pipe connection.

Cleaning system 100 operates by having pressurized water or some other pressurized solvent or disinfecting solution travel along the length of supply pipe 102. Typically, supply pipe 102 is standard ¼-inch, schedule 40 stainless steel pipe. The direction of the flow of the water or the solvent is transverse with respect to the direction of the motion of a conveyor belt, which is driven by and/or tracked by sprocket 30.

In the present invention, sleeve bearing 106 provides a wear surface. With conventional systems, sprocket 30 is designed to rotate directly on supply pipe 102. The continual rotation of sprocket 30 on supply pipe 102 in conventional systems generates a leaching effect between the stainless steel and the PVC sprocket 30, generating a black tarry contaminating substance at their interface. To alleviate this problem, sleeve bearing 106 is designed to slide over supply pipe 102 and prevent relative motion between the stainless steel surface of supply pipe 102 and the PVC surface of sprocket 30.

To prevent wear between the materials, rotation of sleeve bearing 106 must be prevented. To prevent rotation of sleeve bearing 106, sleeve bearing 106 can be internally sized for an interference fit relationship with supply pipe 102. However, this creates a system that is very difficult to assemble and disassemble. In the preferred embodiment of the present invention, apertures 108 are provided in sleeve bearing 106, and located in alignment with nozzles 104. Apertures 108 engage nozzles 104 to prevent rotation of sleeve bearing 106 relative to supply pipe 102.

In another preferred embodiment, aperture 108 is located on an end of sleeve bearing 106. In this embodiment, as illustrated, aperture 108 is preferably semicircular. In another preferred embodiment, each end of sleeve bearing 106 has an aperture 108. Apertures 108 engage nozzles 104 to prevent rotation of sleeve bearing 106 relative to supply pipe 102.

The geometry of apertures 108, however, can vary, so that there are a variety of other shapes that can encompass the geometry of apertures 108. Additionally, a bevel can be added along the edge of apertures to reduce stress concentrations, add clearance for tools for installing and removing nozzles 104, and further reduce the potential for any cracking or wear of sleeve bearing 106.

Sprocket 30 is rotatably mounted on sleeve bearing 106. As illustrated in FIG. 3, sprocket 30 is located between nozzles 104. In this preferred embodiment, engagement of sprocket 30 with nozzles 104 limits lateral movement of sprocket 30.

As the pressurized water or solvent enters supply pipe 102, it is forced through nozzles 104. In FIGS. 4-7, nozzles 104 are shown in greater detail. Each of the nozzles has a spray 202, a grip 204, and a threaded section 206.

In order to utilize nozzles 104, threaded section 206 is adapted to engage a like-threaded aperture on supply pipe 102. Thus, nozzles 104 can be secured into position by rotating nozzles 104 in the direction of the thread on threaded section 206. Due to the preference for having a watertight seal, more than hand torquing is generally necessary. Tool grip 204 is thus shaped for use with a conventional wrench. The ability to employ a wrench allows threaded section 206 of nozzles 104 to be sufficiently torqued into place to provide a watertight seal.

Additionally, each of the spray 202, grip 204, and threaded section 206 is substantially hollow to provide a fluid channel for the pressurized water or other pressurized solvent carried by supply pipe 102 to exit. However, because the flow of the water or solvent is substantially orthogonal to the exit direction of the water or solvent, it is not uncommon to have turbulent flow within the nozzles 104. Turbulent flow within the nozzles 104 can cause a variety of problems, for example cavitation and uneven flow across an exit port 210. These problems can result in reduced cleaning performance and increased likelihood that meat or meat byproduct could remain on portions of conveyor belt 20.

One way to improve flow quality is to employ flow straightener 208. Flow straightener 208 is located within the cavity located within threaded section 206. In particular, flow straightener 208 is shaped as a figure eight; however, a variety of other geometries can also be employed, such as a plurality of straight pipes. By utilizing flow straightener 208, turbulence and pressure loss through each of nozzles 104 can be substantially reduced.

In addition to employing flow straightener 208, the geometry of exit port 210 can also be important to cleaning performance. In the preferred embodiment, nozzles 104 employ a linear exit port; however, there are a variety of other geometries that can be employed, such as circular apertures. The combination of exit port 210 and flow straightener 208 allows for providing a reliable cleaning performance through nozzles 104.

In FIGS. 8-13, a more preferred embodiment is illustrated in which system 100 includes retainers 110 located on sleeve bearing 106. In this embodiment, engagement of sprocket 30 with retainers 110, rather than with nozzles 104, limits lateral movement of sprocket 30 on sleeve bearing 106. In the preferred embodiment, each sloped retainer 110 has a substantially vertical riser 114 formed on its end. Risers 114 extend beyond the exterior surface of sleeve bearing 106 and engage sprocket 30 to limit lateral movement of sprocket 30.

Reliefs 112 in sleeve bearing 106 partially inscribe the perimeter of retainers 110, sufficient as to allow depression of retainers 110. Depression of retainers 110 through reliefs 112 lowers risers 114 to a point approximately even with the exterior surface of sleeve bearing 106 to permit installation and removal of sprocket 30 on sleeve bearing 106. The sloped portion of retainers 110 permits easy installation of sprocket 30 on sleeve bearing 106. In the preferred embodiment, the inside diameter of sprocket 30 can be used to depress retainers 110 and permit sprocket 30 to slide over retainers 110. Once past retainers 110, retainers 110 expand to limit lateral movement of sprocket 30.

In the embodiment disclosed in FIGS. 10 and 11, centering ribs 120 located on the interior surface of sleeve bearing 106 are positioned laterally and axially so as to avoid interference with the operation of retainers 110 when sleeve bearing 106 is located on supply pipe 102. In this embodiment, depression of retainers 110 can be performed with sleeve bearing 106 installed on supply pipe 102. The advantage of this embodiment is that it permits installation and removal of sprocket 30 without removing sleeve bearing 106 from supply pipe 102.

In the embodiment disclosed in FIGS. 12 and 13, centering ribs 120 located on the interior surface of sleeve bearing 106 are positioned laterally and axially so as to interfere with the operation of retainers 110 when sleeve bearing 106 is located on supply pipe 102. In this embodiment, depression of retainers 110 cannot be performed with sleeve bearing 106 installed on supply pipe 102. The advantage of this embodiment is that it prohibits undesired removal of sprocket 30 when sleeve bearing 106 is installed on supply pipe 102.

An advantage of the present invention is that it is simple, safe, and durable. Another advantage of the present invention is that it is inexpensive to manufacture. Another advantage of the present invention is that it provides an easily installed, removed, and repaired cleaning system. Another advantage of the present invention is that it provides a cleaning system that can be installed using only the tools needed to install nozzles 104.

Another advantage of the present invention is that it provides a cleaning system that prevents buildup of leached elements between stainless steel and plastic or PVC surfaces. Other advantages of the present invention will become apparent from the above descriptions, taken in connection with the accompanying drawings, wherein, by way of illustration and example, an embodiment of the present invention is disclosed.

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. A conveyor belt cleaning system, comprising:
a supply pipe having an aperture;
a removable sleeve bearing located on the supply pipe;
a removable spray nozzle located in the aperture, and connected to the supply pipe; and,
wherein engagement of the aperture with the nozzle prevents rotation of the sleeve bearing.

2. The system of claim 1, further comprising:
a sprocket rotatably mounted on the sleeve bearing.

3. The system of claim 1, further comprising:
the sleeve bearing being located between two spray nozzles.

4. The system of claim 1, further comprising:
the supply pipe comprised of stainless steel.

5. The system of claim 1, the further comprising:
a plurality of centering ribs located on the interior of the sleeve bearing.

6. The system of claim 1, further comprising:
the sleeve bearing comprised of plastic.

7. The system of claim 5, further comprising:
the sleeve bearing comprised of Polyvinyl Chloride (PVC).

8. The system of claim 1, further comprising:
the aperture is substantially semi-circular.

9. The system of claim 1, further comprising:
the removable spray nozzle comprised of stainless steel.

10. The system of claim 1, further comprising:
the spray nozzle is thread-connected to the supply pipe.

11. The system of claim 1, further comprising:
the spray nozzle generates a substantially linear spray pattern.

12. The system of claim 1, further comprising:
a flow straightener attached to a nozzle.

13. The system of claim 1, further comprising:
a plurality of centering ribs located on the interior of the sleeve bearing.

14. A conveyor belt cleaning system, comprising:
a supply pipe having an aperture;
a removable sleeve bearing located on the supply pipe;
a plurality of retainers located on the sleeve bearing;
a removable spray nozzle located in the aperture, and connected to the supply pipe; and,
wherein engagement of the aperture with the nozzle prevents rotation of the sleeve bearing.

15. The system of claim 14, further comprising:
a sprocket rotatably mounted on the sleeve bearing between retainers; and,
wherein engagement of the sprocket with the retainers limits lateral movement of the sprocket on the sleeve bearing.

16. The system of claim 14, further comprising:
a relief in the sleeve bearing partially inscribing the perimeter of the retainer;
the retainer being sloped, and having a substantially vertical riser extending beyond the exterior surface of the sleeve bearing; and,
wherein the relief permits depression of the riser substantially even with the exterior surface of the sleeve bearing.

17. The system of claim 14, further comprising:
a plurality of centering ribs located on the interior of the sleeve bearing.

18. The system of claim 17, further comprising:
a centering rib being located in alignment with a retainer.

19. The system of claim 17, further comprising:
a centering rib being located out of alignment with a retainer.

* * * * *